US006870930B1

(12) United States Patent
Kim et al.

(10) Patent No.: US 6,870,930 B1
(45) Date of Patent: Mar. 22, 2005

(54) METHODS AND SYSTEMS FOR TMDS ENCRYPTION

(75) Inventors: Gyudong Kim, Sunnyvale, CA (US); Victor M. Da Costa, Santa Cruz, CA (US); Bruce Kim, Cupertino, CA (US); David D. Lee, Palo Alto, CA (US); Russel A. Martin, Menlo Park, CA (US); Seung Ho Hwang, Palo Alto, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 09/579,811

(22) Filed: May 26, 2000

Related U.S. Application Data (60) Provisional application No. 60/136,695, filed on May 28, 1999.

(51) Int. Cl.$^7$ .............................. H04L 9/00; H04K 1/06; H04N 7/167
(52) U.S. Cl. .............................. 380/42; 380/44; 380/37; 380/200; 380/210
(58) Field of Search .............................. 380/42, 44, 37, 380/200, 201, 210, 225

(56) References Cited

U.S. PATENT DOCUMENTS

| | | | | |
|---|---|---|---|---|
| 3,649,915 A | * | 3/1972 | Mildonian, Jr. ............. | 375/286 |
| 5,546,461 A | * | 8/1996 | Ibaraki et al. .............. | 380/217 |
| 5,720,034 A | * | 2/1998 | Case ........................ | 380/283 |
| 5,825,824 A | * | 10/1998 | Lee et al. ................... | 375/292 |
| 5,835,498 A | | 11/1998 | Kim et al. .................. | 370/537 |
| 5,974,464 A | | 10/1999 | Shin et al. .................. | 709/231 |
| 5,999,571 A | | 12/1999 | Shin et al. .................. | 375/292 |
| 6,345,330 B2 | * | 2/2002 | Chu .......................... | 710/65 |

OTHER PUBLICATIONS

Widmer et al.; "A DC–Balanced, Partitioned–Block, 8B/10B Transmission Code"; Sep. 1983; IBM J.RES. Develop; vol. 27, No. 5; p. 440–451.*

Halsall, Fred; Data Communcations, Computer Networks and Open Systems; 1996; Addison–Wesley Publishing Company; 4$^{th}$ Edition; pp. 96–167.*

DVI Content Protection System; Revision 0.95; Jan. 11, 2000; 39 pages.

DVI Content Protection System; Revision 0.57; Aug. 27, 1999; 26 pages.

Digital Visual Interface DVI; Revision 1.0; Apr. 2, 1999; Digital Display Working Group; 76 pages.

* cited by examiner

Primary Examiner—Gilberto Barrón
Assistant Examiner—Jung W Kim
(74) Attorney, Agent, or Firm—Perkins Coie LLP

(57) ABSTRACT

The present invention is directed to systems and methods for protecting digital content during transmission. One version of the invention provides a method for encryption in a high-speed digital video transmission system that includes the steps of: a) performing transition controlled encoding of a first sequence of n bit data words into encoded n+1 bit data characters where the n is a positive integer, b) performing XOR masking of the encoded n+1 bit data characters with an XOR mask to produce masked n+1 bit data characters; c) DC balancing the masked n+1 bit data characters to produce DC balanced, masked n+2 bit data characters; d) scrambling the DC balanced, masked n+2 bit data characters using a scrambling formula to produce encrypted n+2 bit data characters; e) encoding control data into encoded n+2 bit control characters, f) generating a serial data stream in response to the encrypted data characters and encoded control characters, and g) transmitting the serial data stream over a communication link. Subsequent to step (e) and prior to step (f), the method can further include the step of encrypting the encoded n+2 bit control characters, such that the generating step generates a serial data stream in response to the encrypted data characters and the encrypted control characters.

13 Claims, 10 Drawing Sheets

METHODS AND SYSTEMS FOR TMDS ENCRYPTION

RELATED APPLICATIONS

This application claims the benefit of co-pending U.S. Provisional application Ser. No. 60/136,695, filed May 28, 1999, entitled "Encryption Method for TMDS," and incorporated herein by reference.

BACKGROUND OF THE INVENTION

1. Field of the Invention

The present invention relates generally to coding schemes for digital transmission systems. More particularly, the present invention relates to systems and methods for protecting digital video content during transmission.

2. Description of Background Art

Secure, high-speed communication of information among different devices is increasingly important as electronic and computer technology continues to evolve. For example, it is now more desirable than ever to provide for high-speed communications among different chips on a circuit board, different circuit boards in a system, and different systems with each other. There is a need to provide such communications at high speeds in view of the increasing amount of data required for data communications in intensive data consuming systems using graphical or video information, multiple input-output channels, local area networks, and the like.

There is also a need for secure communication as a result of the increased value of the communicated content and the increased likelihood that communicated content will be copied or altered. Communicated content is increasing in value as a result of an increase in the amount of communicated content and an increase in the quality of communicated content. For example, popular movies continue to become widely available on DVD format. Such valuable content provides a large incentive for potential digital video pirates. In addition, since digital information replicates perfectly, copying a digital source is easier than copying an analog source.

Thus, it is particularly desirable to enable individual personal computers, workstations, or other computing devices, within which data is normally internally transferred using parallel data buses, to communicate with each other over relatively simple transmission lines in a manner that discourages digital content pirating. Such transmission lines typically include only one or two conductors, in contrast with the 64-bit and wider data paths. In the case of video data transmission to computer displays, as well as in the case of high-speed video input from digital cameras to computer systems, existing interconnection interfaces typically employ parallel data paths. The requisite bandwidth of such interconnection systems has increased as a consequence of increased display resolution.

Various techniques exist for improving the characteristics of transmission over serial links. For example, transmission codes may be employed to alter the frequency spectrum of the transmitted serial data so as to facilitate clock recovery and enable AC coupling. Each transmission code will also typically provide special characters, not included within the data alphabet, to be used in character synchronization, frame delimiting, as well as perhaps for diagnostic purposes.

Coding may also be employed to reduce transmission bandwidth as a means of limiting the signal distortion occurring during propagation through the transmission medium. In the case of wire links, it is desirable to utilize codes with no DC and little low frequency content in order to allow for DC isolation of the driver and receiver circuitry from the transmission line, as well as to reduce signal distortion on the line. An efficient coding system should also be disposed to encode clock information with the encoded data in a manner allowing for extraction of the clock information during decoding. This obviates the need for provision of a separate clock signal over a dedicated clock line, since the clock information recovered during decoding may be instead used by the receiver circuitry. Thus, there is a need for an encryption scheme that preserves desirable properties of a serial link transmission code and yet, at the same time, is difficult to decipher. The encryption scheme should make it particularly difficult for pirates to tap the transmission line in an effort to record the raw digital stream into a digital storage media.

SUMMARY OF THE INVENTION

In accordance with the present invention, there is provided systems and methods for protecting digital content during transmission. There are at least two elements of a system for protecting the transmission of high-speed digital content. The first element is the authentication and master key exchange (AKE) protocol. Through this protocol, a video transmitter verifies that a given video receiver is authorized to receive protected content and the transmitter and the receiver agree on a master key for at least a portion of the upcoming transmission session. The transmitter and receiver can periodically change the shared master key.

The second element of a system for protecting the transmission of high-speed digital content is transmission of encrypted data between the transmitter and the authorized receiver. Part of the encryption of the transmitted data is based on a slave key derived from the exchanged master key. The slave key generation occurs internal to the transmitter and receiver, making the encrypted data harder to decipher through eavesdropping alone.

One version of the invention provides a method for encryption of digital data for transmission from a transmitter to a receiver. The method includes the steps of a) providing digital data to a transmitter; b) performing XOR masking of the digital data with an XOR mask to produce masked digital data; c) scrambling the masked digital data using a scrambling formula to produce encrypted digital data; and d) transmitting the encrypted digital data to a receiver.

Subsequent to step (a) and prior to step (b), the method can further include the step of performing transition controlled encoding of the provided digital data to produce encoded digital data, such that step (b) XOR masks the encoded digital data to produce masked digital data.

Similarly, subsequent to XOR masking step (b) and prior to scrambling step (c), the method can further include the step of DC balancing the masked digital data to produce DC balanced, masked digital data, such that step (c) scrambles the DC balanced, masked digital data to produce encrypted digital data.

The system can break the digital data up into at least a first portion and a second portion and can perform steps (a) to (c) for the first portion and for the second portion of the digital data. For example, if the digital data is digital video data including pixel data sets, the system can perform steps (a) to (c) for each pixel data set.

The method can further include the steps of i) exchanging a master key between the transmitter and the receiver; and ii) deriving from the master key a first slave key for the first portion of data, and a second slave key for the second portion of data. Prior to step (b) and subsequent to step (ii), the method can further include the step of selecting first and second XOR masks based on information obtained from the first and second slave keys, respectively. The first and second XOR masks perform the XOR masking of step (b) on the first and second portions of data, respectively.

Similarly, subsequent to step (ii) and prior to step (c), the method can include the step of selecting first and second scrambling formulas based on information obtained from the first and second slave keys, respectively. The first and second scrambling formulas perform the scrambling of step (c) on the first and second portions of digital data, respectively.

The step of deriving first and second slave keys from the master key can include the steps of selecting M bits of the master key as initial values for a M-bit LFSR; selecting a LFSR configuration based on N bits of the master key; and using the selected LFSR configuration and the M-bit LFSR to derive first and second slave keys.

In a preferred embodiment, the M-bit LFSR is a 32-bit LFSR, although it can be a variety of lengths.

Preferably, the selected XOR masks preserve the transition minimized differential signal (TMDS) code space. Similarly, preferably, the selected scrambling formulas preserve the TMDS code space.

Another version of the invention provides an apparatus for encryption of digital data for transmission from a transmitter to a receiver. The apparatus includes a communication link having a first end and a second end, a video transmitter coupled to the first end of the communication link, and a video receiver coupled to the second end of the communication link for receiving the encrypted digital data. The video transmitter includes: a digital data receiver for receiving input digital data; a transition controller for performing transition controlled encoding of the input digital data to produce encoded digital data; XOR mask logic for performing XOR masking of the encoded digital data with an XOR mask to produce masked digital data; DC balancing logic for DC balancing the masked digital data to produce DC balanced, masked digital data; scrambling logic for scrambling the DC balanced, masked digital data using a scrambling formula to produce encrypted digital data; and a transmitter assembly for transmitting the encrypted digital data.

The digital data can have at least a first portion and a second portion such that the apparatus operates individually on the first portion and on the second portion of the digital data. For example, as described above, the digital data can contain pixel data sets, and the apparatus can encrypt each pixel data set individually. In other words, the apparatus can derive a slave key from master key for each pixel and can then select, for each pixel presented for encryption and transmission, an XOR mask and scrambling formula based on the derived slave key.

The apparatus can further include an authentication and key exchange (AKE) module for exchanging a master key between the transmitter and the receiver; and an encryption key generation module for deriving, from the master key, a first slave key for the first portion of data, and a second slave key for the second portion of data.

The apparatus can further include a mask selection module for selecting first and second XOR masks based on information obtained from the first and second slave keys, respectively. The XOR masking logic uses the first and second XOR masks for XOR masking the first and second portions of data, respectively.

The apparatus can further include a scrambling formula selection module for selecting first and second scrambling formulas based on information obtained from the first and second slave keys, respectively. The scrambling logic uses first and second scrambling formulas for scrambling the first and second portions of digital data, respectively.

The encryption key generation module (EKGM) derives from the master key a first slave key for the first portion of data, and a second slave key for the second portion of data. The EKGM can include: an assembly for selecting M bits of the master key as initial values for a M-bit LFSR; an assembly for selecting a LFSR configuration based on N bits of the master key; and an assembly for using the selected LFSR configuration and the M-bit LFSR to derive first and second slave keys.

Another version of the invention provides a method for encryption in a high-speed digital video transmission system. The method includes the steps of: a) performing transition controlled encoding of a first sequence of n bit data words into encoded n+1 bit data characters where the n is a positive integer, b) performing XOR masking of the encoded n+1 bit data characters with an XOR mask to produce masked n+1 bit data characters; c) DC balancing the masked n+1 bit data characters to produce DC balanced, masked n+2 bit data characters; d) scrambling the DC balanced, masked n+2 bit data characters using a scrambling formula to produce encrypted n+2 bit data characters; e) encoding control data into encoded n+2 bit control characters, f) generating a serial data stream in response to the encrypted data characters and encoded control characters, and g) transmitting the serial data stream over a communication link.

Subsequent to step (e) and prior to step (f), the method can further include the step of encrypting the encoded n+2 bit control characters, such that the generating step generates a serial data stream in response to the encrypted data characters and the encrypted control characters.

BRIEF DESCRIPTION OF THE DRAWINGS

Additional objects and features of the invention will be more readily apparent from the following detailed description and appended claims when taken in conjunction with the drawings in which:

DETAILED DESCRIPTION OF THE PREFERRED EMBODIMENTS

This invention relates to content protection for high-speed data transmission systems. Such systems are used for communication between end user systems and digital displays, high-speed networks, and data storage systems. The following detailed description describes the invention in the context of a video transmission system for illustrative purposes only. The invention is useful in other high-speed digital communication applications, such as for communicating with a redundant array of independent disks (RAID).

As noted above, there are at least two elements of a system for protecting the transmission of high-speed digital content. The first element is the authentication and master key exchange (AKE) protocol. Through this protocol, a video transmitter verifies that a given video receiver is authorized to receive protected content and the transmitter and the receiver agree on a master key for at least a portion of the upcoming transmission session. The transmitter and receiver can periodically change the shared master key. AKE protocols are known to those of skill in the art of encryption of digital data transmissions.

The second element of a system for protecting the transmission of high-speed digital content is transmission of encrypted data between the transmitter and the authorized receiver. The second element, the transmission of encrypted digital data, is the focus of the present invention.

Figure 1:
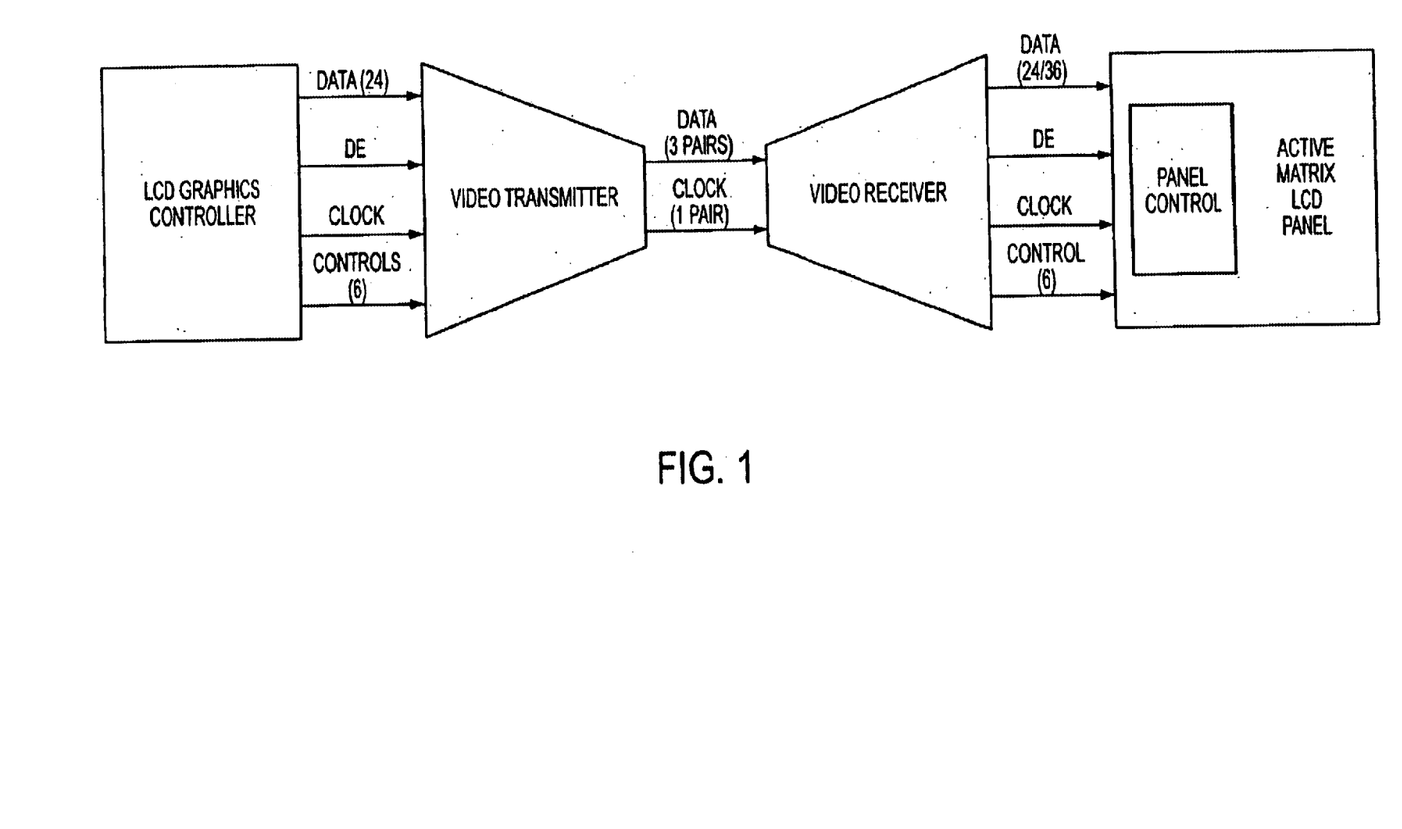
FIG. 1 shows a high-level block diagram of a high-speed digital video signal transmission system in which a host computer system effects high-speed video transmission to a system display.

FIG. 1 shows a high-level block diagram of a high-speed digital video signal encryption and transmission system in which the system effects high-speed encrypted video transmission between a host computer system and a system display. The high-speed, encrypted digital video signal transmission system provides parallel interfaces to both the computer system's display/graphics controller and the display devices. Parallel interfaces remove the need for modifications of existing systems other than the addition of high-speed digital encryption transmitter and receiver modules contemplated by the present invention.

The illustrated embodiment is capable of converting parallel video data streams and video display timing and control signals to three high-speed serial data channels at speeds capable of supporting high-resolution displays (800 by 600 color pixels and above resolutions) and digital video input/output sources/destinations. The illustrated embodiment provides this support while making the copying of the video data streams more difficult.

Figure 2A:
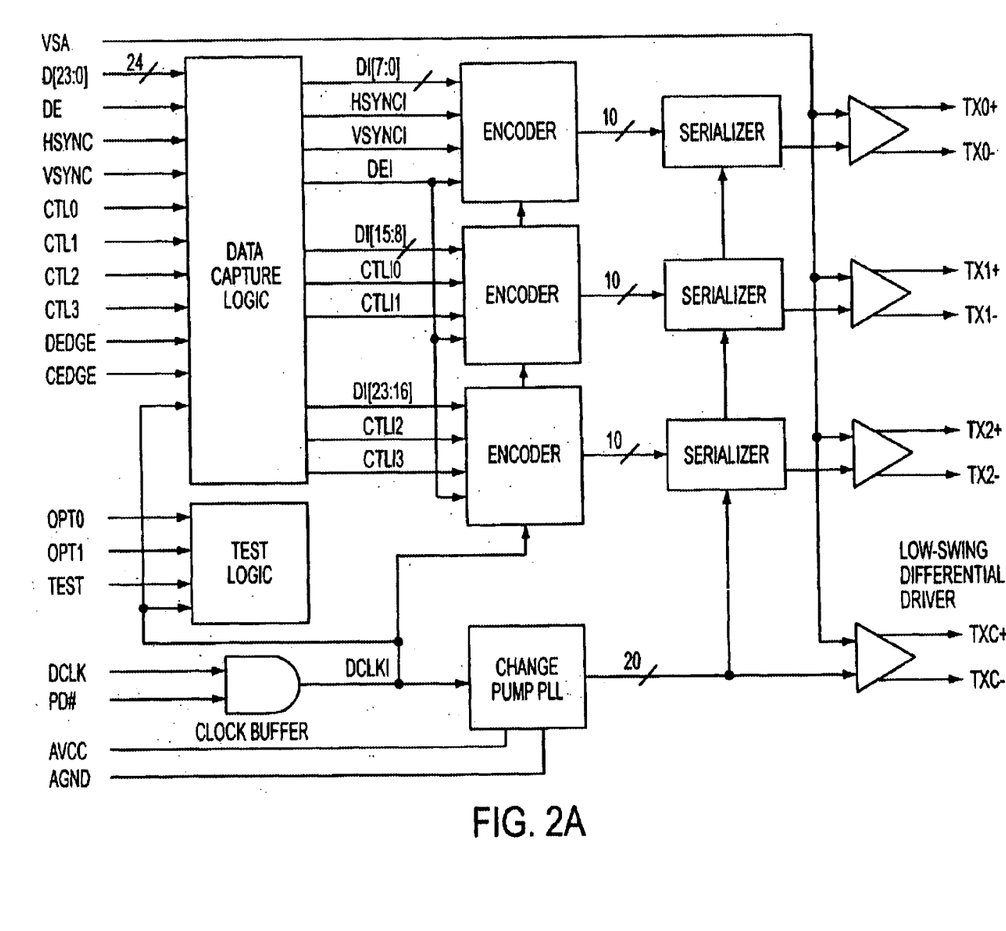
FIG. 2A shows a functional block diagram of a preferred implementation of the video link transmitter of FIG. 1.

FIG. 2A shows a functional block diagram of a preferred implementation of a video link transmitter of the system of FIG. 1. The video link transmitter can take the form of an integrated circuit. The transmitter includes a data capture logic block, three data encoders, three serializers and three high-speed channel drivers. The transmitter sends a clock signal on a channel that exists in addition to the three data channels.

Figure 2B:
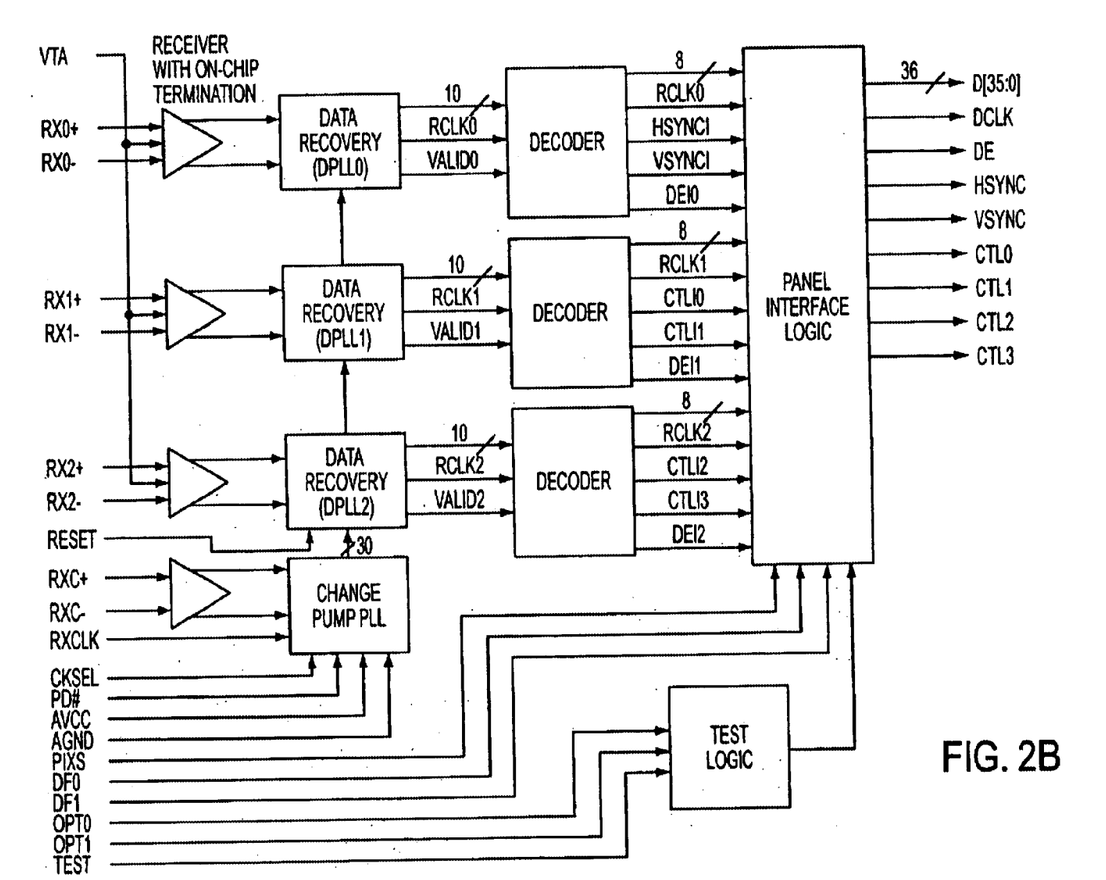
FIG. 2B shows a functional block diagram of a preferred implementation of the video link receiver of FIG. 1.

FIG. 2B shows a functional block diagram of the video receiver of FIG. 1. The video link receiver chip includes three differential receiver circuits, three data recovery modules, three decoders, and panel interface logic. The three differential receiver circuits receive the signals transmitted in the three high-speed data channels by the transmitter of FIG. 2A. In addition, another differential receiver circuit receives the transmitted clock signal.

As shown in FIG. 2A, each encoder unit encodes 8 bits of data, data enable (DE), and 2 bits of control signals. The three functionally equivalent encoders generate 10-bit, transition controlled, DC balanced, encrypted characters to transmit all data and control characters. U.S. Pat. No. 5,974,464, entitled "System for High Speed Serial Video Signal Transmission Using DC-Balanced Coding, and incorporated herein by reference, provides a detailed description of 8B/10B transition-controlled coding schemes.

Control signals are assumed to change only during blank time, i.e., when DE is low/inactive. According to a preferred embodiment, when the transmission system is operating in low transition mode, there are four control signals. The following constitutes an exemplary set of out-of-band control signals for the low transition mode:

1101010101
1101010100
0010101010
0010101011

Figure 3A:
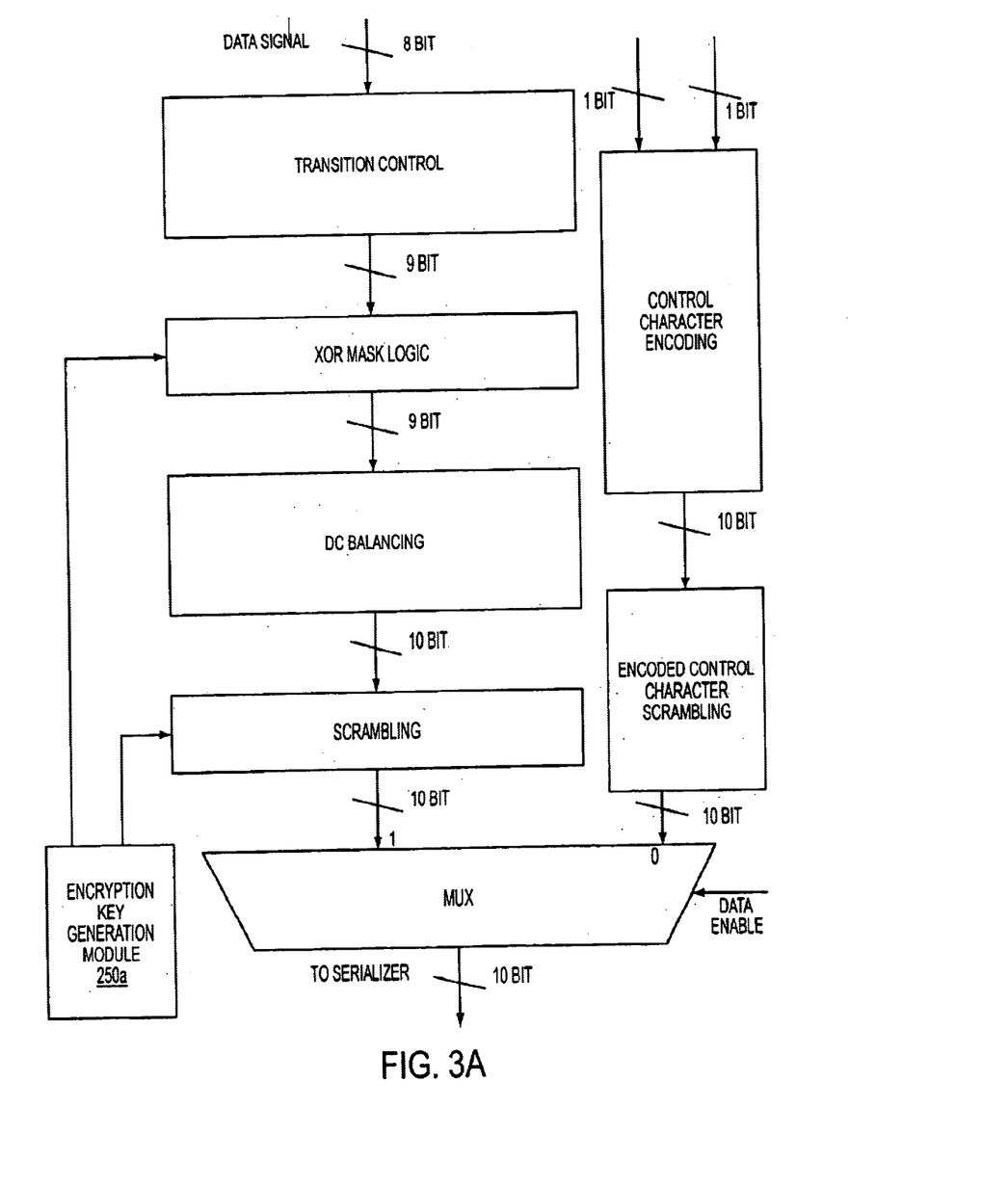
FIG. 3A shows a functional block diagram of a preferred implementation of the encoder of FIG. 2A.
Figure 4:
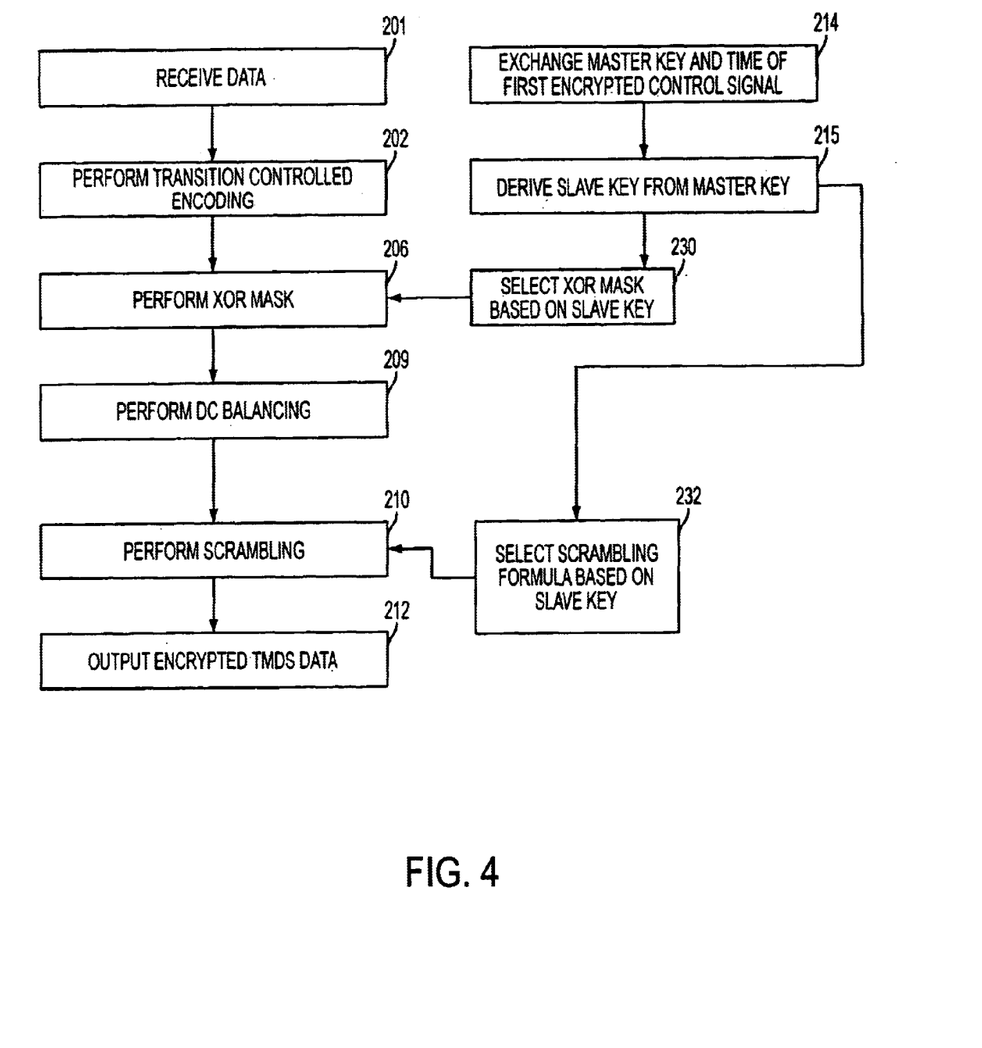
FIG. 4 is a flow chart of an encryption method implemented in the system of FIG. 1.

FIG. 3A shows one embodiment of the encoder of FIG. 2A. FIG. 4 illustrates the operation of the encoder of FIG. 2A. The encoder uses transition control logic to predictably encode 202 an 8-bit data block so as to control the number of transitions that occur in the encoded data block. The transition control logic produces a 9-bit, encoded data character. Subsequent to transition control, XOR mask logic performs XOR masking 206 of the 9-bit, encoded data character to produce a 9-bit, masked, encoded data character. DC balancing logic then performs DC balancing 209 of the 9-bit, masked, encoded data character to produce a 10-bit, DC balanced, masked, encoded data character. Finally, scrambling logic performs scrambling 210 of the 10-bit, DC balanced, masked, encoded data character to produce a 10-bit, DC balanced, transition-controlled, encrypted data character. As noted above, U.S. Pat. No. 5,974,464, entitled "System for High Speed Serial Video Signal Transmission Using DC-Balanced Coding, teaches transition control encoding and DC balancing.

According to a preferred embodiment, the 2 bits of control signals are also encoded into a 10-bit control character. The encoder encrypts, e.g., scrambles, the 10-bit control character. A multiplexer, triggered by the data enable signal, then multiplexes the 10 bit, DC balanced, transition-controlled, encrypted data characters and the encrypted, e.g., scrambled, 10-bit control characters.

Figure 3B:
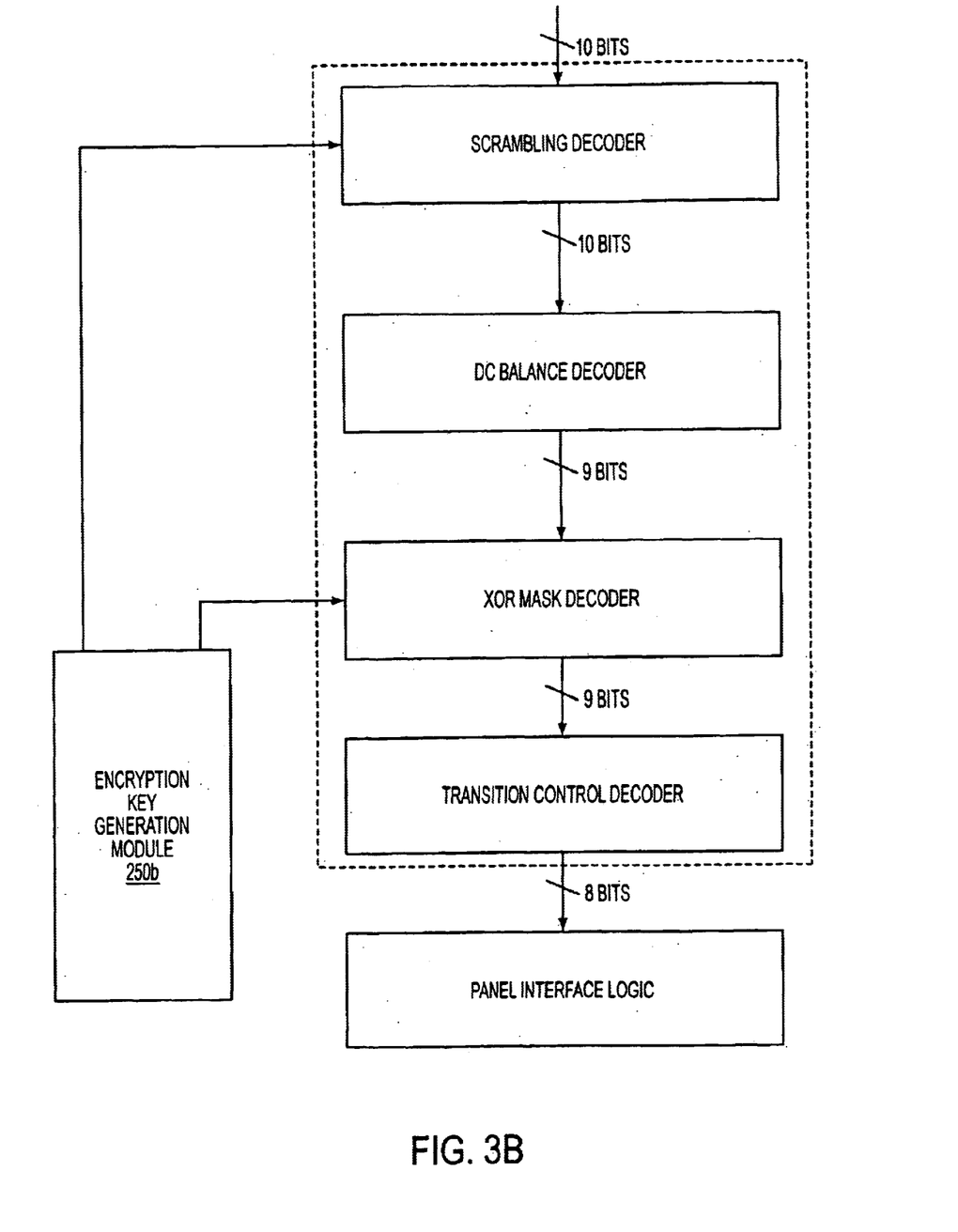
FIG. 3B shows a functional block diagram of a preferred implementation of the decoder of FIG. 2B.

FIG. 3B shows one embodiment of the decoder of FIG. 2B. Each decoder receives 10-bit DC balanced, transition-controlled, encrypted data characters. A scrambling decoder, DC balanced decoder, XOR mask decoder, and a transition control decoder each operate in turn on a received, encoded data character to reverse the encoding process and reproduce the 8-bit data block that the was originally input to the transmitter for transmission. The decoder then transmits the 8-bit data block to panel interface logic.

Figure 5:
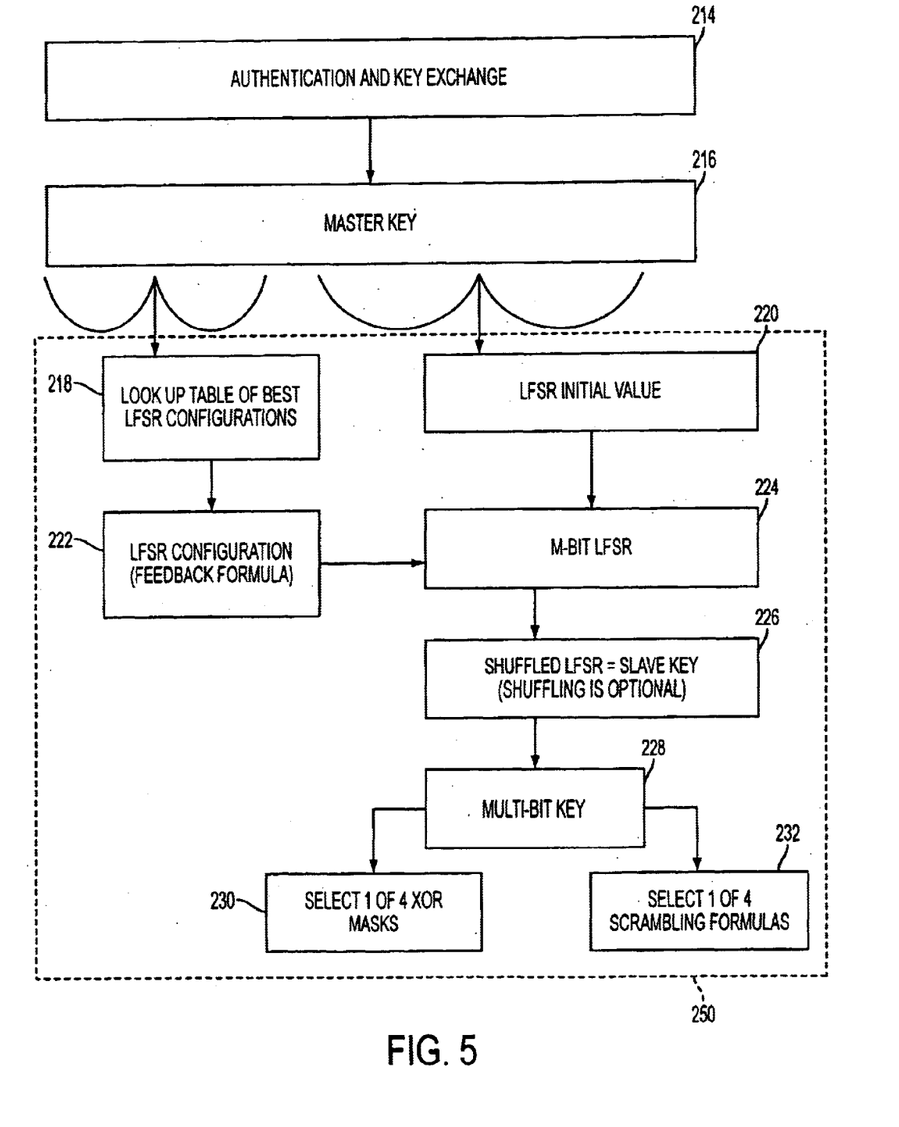
FIG. 5 is a flow chart for the derivation of the XOR mask and scrambling formula used in FIG.4.

An encryption key generation module 250, shown in FIGS. 3A, 3B, and 5, preferably a block of an ASIC in the video transmitter of FIG. 1, selects the XOR mask and scrambling formula applied in the encoder so as to preserve the transition-controlled differential signal (TMDS) code space. The TMDS code space is occupied with those codes that match TMDS criteria. For example, in low transition mode, the code space is occupied with codes that include less than four transitions.

The XOR masks that preserve the TMDS code space in low transition mode are the following:

000000000
011111111
100000000
111111111

In addition, given the 10-bit character abcdefghij, where the letters, e.g., a, b, c, represent a particular bit, the scrambling formulas that preserve the TMDS code space in low transition mode are the following:
1) abcdefghij;
2) bacdefghij;
3) abjihgfedc; and
4) bajihgfedc.

The encryption key generation modules 250a, 250b, existing in both the encoder and the decoder, and shown in FIGS. 3A and 3B, use the master key exchanged in the AKE protocol to derive a slave key and then use the slave key to select the XOR masks and the scrambling formulas. Referring to FIG. 5, an AKE process 214 provides a master key 216 to both the transmitter and the receiver. According to a preferred embodiment, the EKGM uses M bits from the master key to provide initial values for an M bit linear feedback shift register (LFSR). The LFSR can be a variety of lengths including 16 bits long, and most preferably 32-bits long.

In addition, the EKGM uses bits from the master key to select a LFSR configuration, i.e., a feedback formula for the LFSR. For example, the bits from the master key can point to an address in a LFSR configuration look-up table. The EKGM then uses the addressed LFSR configuration to construct an M-bit LFSR slave key generator. According to a preferred embodiment, LFSR configurations are formed by creating an XOR feedback function to the first element in the LFSR, and the XOR function has selected addresses within the LFSR as inputs. The addresses that are selected as inputs for the XOR can be based on bits contained in the master key. LFSR configurations useful for encryption are known to those of skill in the art of encryption for digital data transmission.

By populating the LFSR with initial values from the master key and by selecting a LFSR configuration, the encryption key generation module (EKGM) creates an M-bit LFSR. Each time the LFSR shifts, it provides a slave key. By continually providing new, although not necessarily unique, slave keys, the system makes it more difficult to decipher the encrypted content by intercepting the transmitted data stream. In a preferred embodiment, the EKGM shuffles the output of the M-bit LFSR to produce a slave key 226. Shuffling the output of the M-bit LFSR makes it even more difficult to decipher the encrypted content by intercepting the transmitted stream.

Alternatively, mixing the output of a single LFSR with another LFSR having a different period can provide a more random sequence than is provided by the single LFSR. According to another alternative embodiment, the system can use part of an LFSR to indicate a jumping address that randomly moves a sampling window, thus, improving the randomness of the generated key stream. It is also possible to connect two LFSRs to get a longer period.

The EKGM then selects 1 of the 4 XOR masks described above using 2 bits from the slave key. In addition, The EKGM selects 1 of the 4 scrambling formulas described above also using 2 bits from the slave key. The XOR mask selection bits and the scrambling formula selection bits can have 0, 1, or 2 bits in common. Referring to FIG. 4, once the XOR mask and scrambling formula are selected, the encryption process described above proceeds using the selected XOR mask and scrambling formula. In a preferred embodiment, the XOR mask and scrambling formula are selected concurrently. However, because the scrambling step 210 occurs later in the encryption process, a delay of preselected number of clocks is built into the application of the selected scrambling formula to the data being encrypted.

The EKGM can provide a different slave key and therefore a different XOR mask and scrambling formula for different portions of the input digital data. In a preferred embodiment, the EKGM provides a different slave key for each pixel of digital video data.

If the applied XOR masking and scrambling are the same for a long period of time, the encryption is more susceptible to deciphering. Thus, the present encryption methods are stronger if the methods select the XOR mask and scrambling formula based on a continually changing key. However, high-speed digital transmission systems do not contain a high-speed side channel that is synchronized with the TMDS channel for transmitting changing key information that changes, for example, with every pixel transmitted. However, by generating a slave key in the transmitter and the receiver based on a master key, as in the present invention, the system can generate a slave key rapidly based on a master key that is transmitted only once per multiple slave generation cycles.

The operation of the EKGM is the same in both the transmitter and the receiver. Therefore, by using the same master key, the EKGM will select the same slave keys for encryption and decryption.

Figure 6:
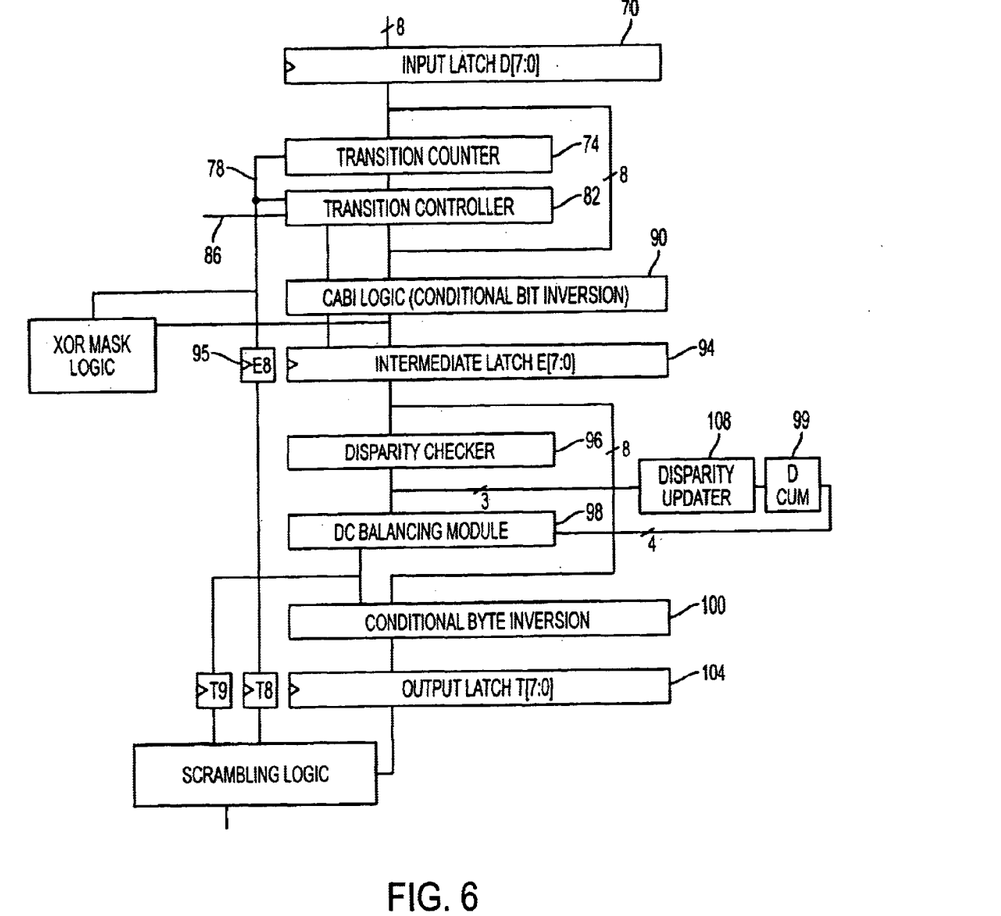
FIG. 6 shows a data flow chart for the operation of the encoder of FIG. 2A.

Referring to FIG. 6, the overall functional organization of the transition-controlled DC-balanced encryption encoder of FIG. 2A is shown in the form of a data flow chart. In FIG. 6, the 8-bit parallel data is latched within an input latch 70 comprised of, for example, eight D-type flip-flops. A transition counter is operative to count the number of transitions in logical value between adjacent bits of each byte of parallel data within latch 70.

A count line 78 is set to a predefined logical value by counter 74 if four or more logical transitions are counted between bits of the latched byte, and is set to the complement of the predefined logical value otherwise. In what follows, it will be assumed that count=0 if four or more logical transitions are counted by counter 78 and that count=1 otherwise.

As is indicated by FIG. 6, a transition controller 82 is responsive to count line 78 and to a mode select line 86. Mode select line 86 determines whether encoding is to be performed using the high-transition set or the low-transition set of code characters. When mode select line 86 indicates that low-transition encoding has been selected and count line 78 registers that four or more logical transitions are present within the byte stored within latch 70, the transition controller instructs conditional alternate bit inversion (CABI) logic 90 to invert the even bits in the byte stored within latch 70.

After CABI logic 90 has provided a byte having a number of logical transitions within the appropriate range, XOR masking logic is applied to the resulting 9-bit character and the resulting 9-bit masked, encoded data is transferred to latch 94. The XOR mask is selected by the EKGM module 250a of FIG. 3A.

Subsequent to XOR masking, a DC balancing process is performed in which the cumulative disparity between complementary logical values within the stream of 10-bit encoded characters produced by the encoder 18 is controlled. As used herein, the term cumulative disparity (D cum) denotes the excess of one bits relative to zero bits produced by the encoder 18 subsequent to synchronization being achieved with the decoder 44 in the manner described below. The term current disparity (D cur) refers to the excess of one bits to zero bits within the byte currently stored within latch 94. D cur is determined by disparity checker 96.

A DC-balancing module 98 serves to compare the current disparity to the cumulative disparity stored within latch 99 The result of the comparison is then used to determine whether the byte stored within latch 94 is inverted by conditional byte inversion (CTBI) logic 100 during the course of transfer of the masked encoded 9-bit character to the output latch 104. In this way CTBI logic 100 serves to minimize the cumulative disparity associated with the serial stream produced by the encoder 18. Finally, scrambling logic is applied to the 10-bit DC balanced, masked, encoded character to produce an encrypted, 10-bit DC balanced, transition-controlled character for transmission. Again, the EKGM selects the scrambling formula applied in the scrambling logic.

Figure 7:
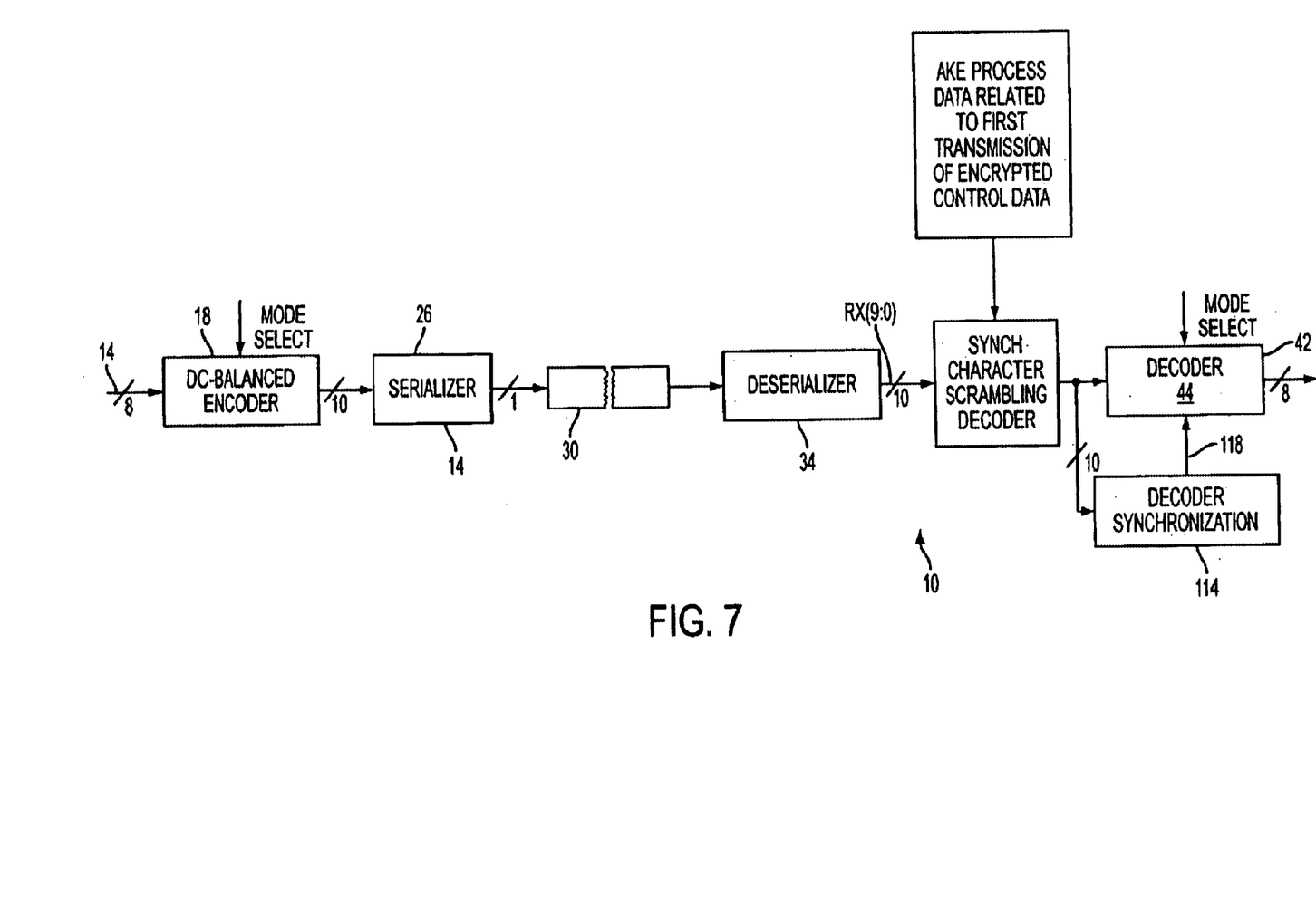
FIG. 7 is a block diagram depicting the encoding and decoding system of FIG. 1.
Figure 8:
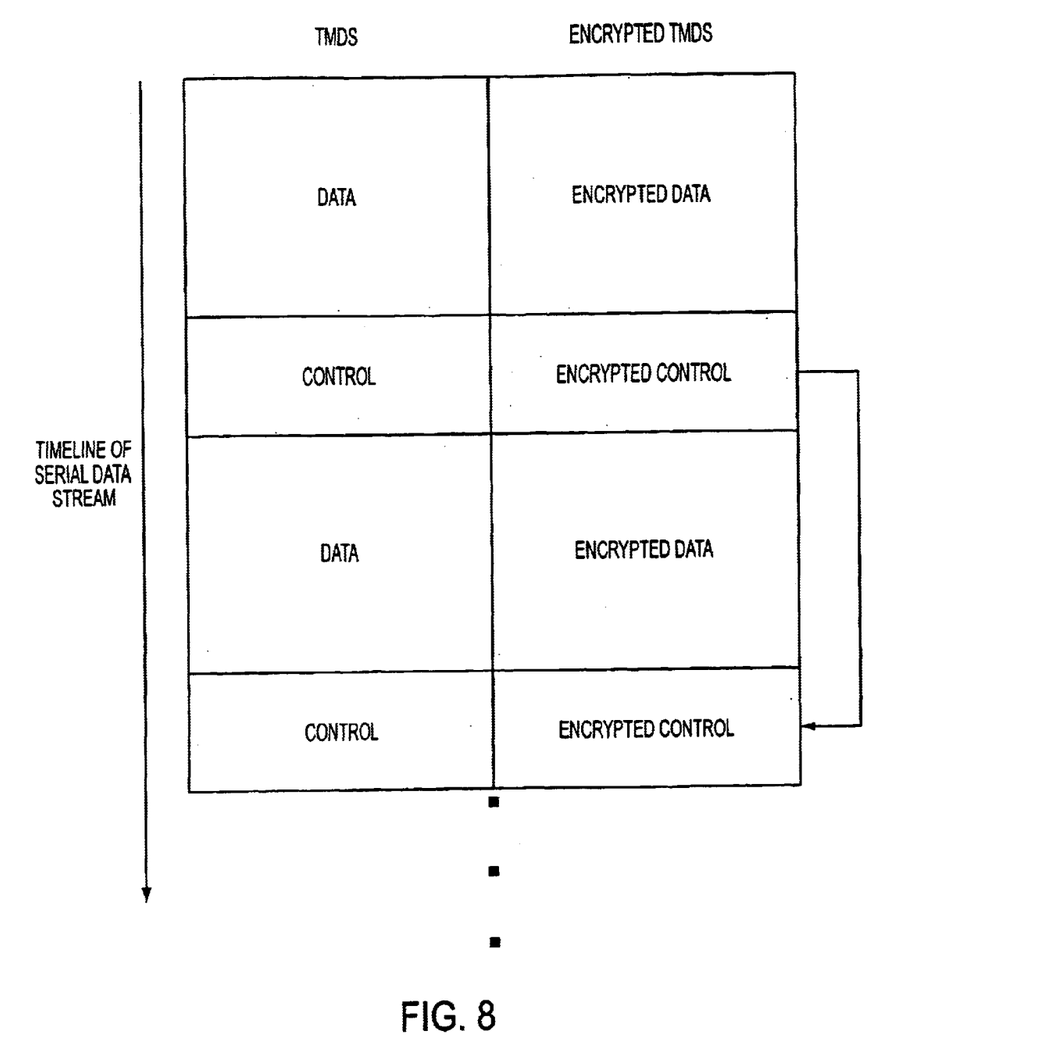
FIG. 8 shows a timeline of a serial data stream for transmission via the system of FIG. 1.

Referring to FIGS. 7 and 8, the control signals sent to the receiver during data enable (de) low period are important for TMDS not only for sending control signals such as hsync, vsync, and control [0:3] but also for providing timing information to the receiver. The timing information includes sampling instance, i.e., where the receiver will find each bit of information, and byte framing where each byte starts within the serial data stream.

For this reason, scrambling the control signals sent during the de low period in the same way that the present system encrypts the video data sent during the de high period would increase the complexity of the receiver substantially. In the encrypted code space, it would be much more difficult to locate the control signals and therefore extract the sampling instance and byte framing information. Without the sampling instance and byte framing information, the decryption cannot begin.

Therefore, according to one embodiment of the invention, the system encrypts only during the de high period, that is only when data signals, e.g., video signals, as opposed to control signals, are transmitted. As this embodiment of the present invention makes the pixel data completely illegible, additional encryption is redundant from a legibility standpoint. However, additional encryption increases the entropy included in the cipher text, making deciphering more difficult.

Thus, an alternative embodiment of the invention corrupts the control signals sent during the DE low period. This embodiment provides a simple way to retrieve the control signals for synchronization. According to this embodiment, for a substantial portion of a DE low period, the transmitter sends synchronization information according to conventional TMDS encoding. Thus, the transmitter sends enough timing information to enable the receiver to proceed with decoding the encrypted data stream.

A typical TMDS receiver requires that the transmitter send at least 3 consecutive special or control characters together to acquire the synchronization, as is described in U.S. Pat. No. 5,974,464, entitled "System for High Speed Serial Video Signal Transmission Using DC-Balanced Coding." However, some high-speed digital transmission receivers can require more than 3 consecutive control characters to acquire synchronization. If the transmitter does not send at least three consecutive, unencrypted control characters, the standard TMDS receiver may not be able to decrypt the subsequently-transmitted, encrypted stream. Thus, a preferred embodiment of the invention guarantees the periodic transmission of a stream of four or more consecutive special or control characters.

The DE corruption protocol proceeds as follows. During the AKE process, the transmitter and receiver independently generate the same master key. Typically, the transmitter and the receiver exchange particular numbers. Then the transmitter and receiver independently generate the same master key based on the particular numbers according to the high-bandwidth digital content protection (HDCP) standard.

After the transmitter and receiver generate the master key, the first time instant for the corrupted DE period is sent with respect to the falling edge of the DE signal. Therefore, the system leaves the first falling edge of the DE signal uncorrupted. Stated another way, the system leaves the first falling edge of the DE signal uncorrupted because the transmitter cannot determine how many pixels there are until it processes the first line of video data.

Since TMDS receivers regard any pattern that is different from one of the four special or control characters as the sign of DE high, the system can send anything other than those four special characters during the DE corruption cycles.

Sometimes the value of the control character toggles at the same instant as the DE corruption is scheduled. According to one embodiment, the system reserve 5 bits out of 24 bits of information that can be sent via the three encoders per clock just for the control signals. In this way, the system can send control signal change at any moment. In an alternative embodiment, the system sends an uncorrupted special or control character to change the state of the control signal. The DE corruption detector then waits for a clock since control signals do not toggle that often.

Preferably, the DE corruption occurs concurrently in the three channels. In this way, potential pirates would not be able to obtain timing information by comparing the data streams within the channels. Once the first DE corruption cycle starts, the system can send 24 bits/clock through the three channels or 8 bits/channel. With reference to FIG. 8, the system sends information indicating the next scheduled DE corruption. The next scheduled DE corruption can be any number of clocks away including the next clock.

In systems where the timing of DE low is completely unpredictable, the transmitter has a FIFO-like memory. In a simpler implementation, the system can have only one corrupted DE cycle per each DE low period. Then the information that the receiver would need for decryption will be the start of the DE low period and the length of the DE low period.

As shown in FIG. 3A, the encryption of the control characters occurs independently from the data character encryption. The system can encrypt the control characters with the same hardware used for data character encryption. Alternatively, the system can use separate hardware for the control character encryption.

The present invention can further include crosschecking the states of both the transmitter and receiver on a regular basis. By crosschecking, the transmitter can determine if the receiver is receiving data correctly; In the event the receiver cannot decipher the encrypted stream properly, the system can either shut the stream down or retry the AKE process.

From the above description, it will be apparent that the invention disclosed herein provides a novel and advantageous system and method of encrypting digital data for transmission from a transmitter to a receiver. The systems and methods described herein advantageously protect digital content during transmission while preserving desirable properties of a serial link transmission code.

What is claimed is:

1. A method for encryption of digital data for transmission from a transmitter to a receiver, comprising the steps of:
    a) providing digital data to a transmitter;
    b) performing XOR masking of the digital data with an XOR mask to produce masked digital data;
    c) scrambling the masked digital data using a scrambling formula to produce encrypted digital data; and
    d) transmitting the encrypted digital data to a receiver
        wherein the method further comprises the step of breaking the digital data up into at least a first portion and a second portion and wherein steps (a) to (c) are performed for the first portion and for the second portion of the digital data;
        wherein prior to step (b), the method further comprises the steps of i) exchanging a master key between the transmitter and the receiver,
ii) deriving from the master key a first slave key for the portion of data, and a second slave key for the second portion of data; and wherein the step of deriving first and second slave keys from the master key comprises the steps of selecting M bits of the master key as initial values for M-bit LFSR;

selecting a LFSR configuration based on N bits of the master key; and using the selected LFSR configuration and the M-bit LFSR to derive first and second slave keys.

2. The method of claim 1, wherein subsequent to step (a) and prior to step (b), the method further comprises the step of performing transition controlled encoding of the provided digital data to produce encoded digital data, such that step (b) XOR masks the encoded digital data to produce masked digital data.

3. The method of claim 2, wherein subsequent to XOR masking step (b) and prior to scrambling step (c), the method further comprises the step of DC balancing the masked digital data to produce DC balanced, masked digital data, such that step (c) scrambles the DC balanced, masked digital data to produce encrypted digital data.

4. The method of claim 3, wherein the digital data is digital video data comprising pixel data sets, and steps (a) to (c) are performed for each pixel data sheet.

5. The method of claim 1, wherein prior to step (b) and subsequent to step (ii), the method further comprises the step of selecting first and second XOR masks based in information obtained from the first and second slave keys, respectively, the first and second XOR mask for performing the XOR masking of step (b) on the first and second portion of data, respectively.

6. The method of claim 1, wherein subsequent to step (ii) and prior to step (c), the method comprises the step of selecting first and second scrambling formulas based on information obtained from the first and second slave keys, respectively, the first and second scrambling formulas for performing the scrambles of step (c) on the first and second portions of digital data, respectively.

7. The method of claim 1, wherein the M-bit LFSR is a 32-bit LFSR.

8. The method of claim 5, wherein the XOR masks are XOR masks that preserve a TMDS code space.

9. The method of claim 6, wherein the scrambling formulas are scrambling formulas that preserve a TMDS code space.

10. An apparatus for encryption of digital data for transmission from a transmitter to a receiver, the apparatus, comprising a communication link having a first end and a second end, a video transmitter coupled to the first end of the communication link, the video transmitter comprising means for receiving digital data;

transition controller for performing transition controlled encoding of the provided digital data to produce encoded digital data;

XOR mask logic for performing XOR masking of the encoded digital data with an XOR mask to produce masked digital data;

DC balancing logic for DC balancing the masked digital data to produce DC balanced, masked digital data;

scrambling logic for scrambling the DC balanced, masked digital data using a scrambling formula to produce encrypted digital data;

means for transmitting the encrypted digital data;

a video receiver coupled to the second end of the communication link for receiving the encrypted digital data;

means for breaking up the digital data into at least a first portion and a second portion and wherein the apparatus operates on the first portion and on the second portion of the digital data;

means for exchanging a master key between the transmitter and the receiver;

means for deriving from the master key a first slave key for the first portion of data, and a second slave key for the second portion of data, wherein said means for deriving from the master key a first slave key for the first portion of data, and a second slave key for the second portion of data comprises:

means selecting M bits of the master key as initial values for M-bit LFSR;

means for selecting a LFSR configuration based on N bits of the master key; and means for using the selected LFSR configuration and the M-bit LFSR to derive first and second slave keys.

11. The apparatus according to claim 10, wherein the apparatus further comprises means for breaking the digital data into pixel data sets, and wherein the apparatus operates on each pixel data set.

12. The apparatus according to claim 10, wherein the apparatus further comprises means selecting first and second XOR masks based on information obtained from the first and second slave keys, respectively, the first and second XOR masks-being used by the XOR masking means for XOR masking the first and second portions of data, respectively.

13. The apparatus according to claim 10, wherein the apparatus further comprises means for selecting first and second scrambling formulas based on information obtained from the first and second slave keys, respectively, the first and second scrambling formulas being used by the scrambling the first and second portions of digital data, respectively.

* * * * *